(12) United States Patent
Gillich et al.

(10) Patent No.: US 11,941,901 B2
(45) Date of Patent: Mar. 26, 2024

(54) SMARTPHONE OR TABLET COMPRISING A DEVICE FOR GENERATING A DIGITAL IDENTIFIER OF A COPY, INCLUDING AT LEAST ONE PRINT IMAGE OF A PRINTED PRODUCT PRODUCED IN A PRODUCTION SYSTEM, AND METHOD FOR USING THIS DEVICE

(71) Applicant: KOENIG & BAUER AG, Würzburg (DE)

(72) Inventors: Eugen Gillich, Bielefeld (DE); Jan Leif Hoffmann, Detmold (DE); Jan-Friedrich Ehlenbröker, Detmold (DE); Uwe Mönks, Lemgo (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 18/033,818

(22) PCT Filed: Nov. 17, 2021

(86) PCT No.: PCT/EP2021/081929
§ 371 (c)(1),
(2) Date: Apr. 26, 2023

(87) PCT Pub. No.: WO2022/106443
PCT Pub. Date: May 27, 2022

(65) Prior Publication Data
US 2023/0334884 A1    Oct. 19, 2023

(30) Foreign Application Priority Data
Nov. 18, 2020    (DE) .............. 10 2020 130 444.7

(51) Int. Cl.
*G06K 9/00*      (2022.01)
*G06V 10/26*     (2022.01)
(Continued)

(52) U.S. Cl.
CPC .............. *G06V 20/95* (2022.01); *G06V 10/26* (2022.01); *G06V 10/60* (2022.01)

(58) Field of Classification Search
None
See application file for complete search history.

(56) References Cited

U.S. PATENT DOCUMENTS

| | | | | |
|---|---|---|---|---|
| 5,048,095 A | * | 9/1991 | Bhanu ............. | G06V 10/26 382/173 |
| 5,982,956 A | * | 11/1999 | Lahmi ............. | H04N 1/444 382/175 |

(Continued)

FOREIGN PATENT DOCUMENTS

| | | |
|---|---|---|
| EP | 2639774 A1 | 9/2013 |
| WO | 2008146262 A2 | 12/2008 |

OTHER PUBLICATIONS

Lee et al., "A Survey on Banknote Recognition Methods by Various Sensors." Sensors (Basel). Feb. 8, 2017;17(2):313. doi: 10.3390/s17020313. PMID: 28208733; PMCID: PMC5335928. (Year: 2017).*

(Continued)

*Primary Examiner* — Feng Niu
(74) *Attorney, Agent, or Firm* — MATTINGLY & MALUR, PC (57) ABSTRACT

In some examples, a smartphone or tablet includes a device able to generate a digital identifier of a copy that includes at least one print image. The device includes at least one optoelectronic detection device that detects the at least one print image and creates a representation that includes a multiplicity of pixels. The device further includes a unit that evaluates brightness intensities of the pixels, that segments the representation into multiple fields that each are composed of pixels of the representation, and that provides each of these fields with a piece of position information. The unit also ascertains, in each of these fields of adjoining pixels, a (Continued)

difference in their respective brightness intensities, and displays the differences as a frequency distribution. A display device further displays the digital identifier of the respective copy of the relevant printed product in the form of a graphical and/or alphanumerical display.

14 Claims, 4 Drawing Sheets

(51) Int. Cl.
*G06V 10/60* (2022.01)
*G06V 20/00* (2022.01)

(56) References Cited

U.S. PATENT DOCUMENTS

| | | | | |
|---|---|---|---|---|
| 8,355,552 | B2* | 1/2013 | Schwartz | G06T 7/0012 |
| | | | | 382/133 |
| 8,781,204 | B2* | 7/2014 | Lohweg | G07D 7/003 |
| | | | | 382/135 |
| 8,781,205 | B2* | 7/2014 | Glock | G07D 7/003 |
| | | | | 382/135 |
| 10,755,138 | B2* | 8/2020 | Chennubhotla | G06T 7/12 |
| 10,909,675 | B2* | 2/2021 | Hu | G06T 7/11 |
| 2008/0317314 | A1* | 12/2008 | Schwartz | G06T 7/0012 |
| | | | | 382/131 |
| 2009/0008924 | A1* | 1/2009 | Ophey | H04L 9/3278 |
| | | | | 250/340 |
| 2009/0074301 | A1 | 3/2009 | Yamamizu | |
| 2010/0195894 | A1* | 8/2010 | Lohweg | G07D 7/003 |
| | | | | 382/135 |
| 2012/0328179 | A1* | 12/2012 | Glock | G07D 7/003 |
| | | | | 382/135 |
| 2015/0342560 | A1* | 12/2015 | Davey | A61B 8/461 |
| | | | | 600/443 |
| 2016/0012658 | A1 | 1/2016 | Lohweg et al. | |
| 2017/0103525 | A1* | 4/2017 | Hu | G06T 7/0012 |
| 2018/0204085 | A1* | 7/2018 | Chennubhotla | G06V 10/426 |

OTHER PUBLICATIONS

Centeno et al., "Identity Document and banknote security forensics: a survey." arXiv preprint arXiv:1910.08993 (2019). (Year: 2019).*
Hardik Jain, et al., "Passive classification of source printer using text-line-level geometric distortion signatures from scanned images of printed documents", Multimedia Tools and Application, vol. 79, No. 11-12, Dec. 23, 2019 (Dec. 23, 2019), pp. 7377-7400, XP037082104, ISSN: 1380-7501, DOI: 10.1007/S11042-019-08508-X.
International Search Report of PCT/EP2021/081929 dated Feb. 28, 2022.

* cited by examiner

SMARTPHONE OR TABLET COMPRISING A DEVICE FOR GENERATING A DIGITAL IDENTIFIER OF A COPY, INCLUDING AT LEAST ONE PRINT IMAGE OF A PRINTED PRODUCT PRODUCED IN A PRODUCTION SYSTEM, AND METHOD FOR USING THIS DEVICE

CROSS-REFERENCES TO RELATED APPLICATIONS

This application is the US national phase, under 35 USC § 371, of PCT/EP2021/081929, filed on Nov. 17, 2021, published as WO 2022/106443 A1 on May 27, 2022, and claiming priority to DE 10 2020 130 444.7, filed on Nov. 18, 2020, and all of which are expressly incorporated by reference herein in their entireties.

TECHNICAL FIELD

Examples herein relate to a smartphone or tablet, each including a device for generating a digital identifier of a copy, including at least one print image, of a printed product produced in a production system. An optoelectronic detection device is configured to detect the at least one print image of the relevant copy of the printed product and, from the detected print image, create a representation composed of a multiplicity of discrete pixels and so as to ascertain at least the brightness intensity for each of these pixels. Additionally, a unit cooperating with the optoelectronic detection device evaluates the brightness intensities of the pixels, and is configured to comprehensively segment the representation of the print image of the currently represented copy of the relevant printed product into multiple fields that each are composed of pixels of this representation. Each of these fields is provided with a piece of position information that is based on the represented print image of the relevant printed product. Further, the unit is configured to ascertain in each of these fields of adjoining pixels which are each composed of pixels of the current representation, a difference in their respective brightness intensities ascertained by the optoelectronic detection device, and so as to display the differences, ascertained from the brightness intensities of adjoining pixels, in the form of a frequency distribution, and so as to calculate, in the respective frequency distribution, a mean value and a standard deviation that is based on the respective mean value, as well as a skewness and a kurtosis of the respective frequency distribution, and to store for all fields of the segmented current representation of the print image of the relevant printed product, in a memory cooperating with this unit, the respective piece of position information of each field, together with the standard deviation calculated in each case for the respective field, as well as skewness and kurtosis, as the digital identifier of the relevant copy of the printed product. Examples herein further relate to a method for using the smartphone or tablet comprising the device.

BACKGROUND

A device for authenticating security documents, in particular banknotes, is known from WO 2008/146262 A2, authentic security documents comprising security features printed, applied or otherwise provided on the security documents, the security features including characteristic visual features intrinsic to the processes used for producing the security documents, the security features encompassing intaglio patterns, line offset patterns, letterpress patterns, optically diffractive structures and/or combinations thereof, and the method comprising the following steps:

acquiring a sample image of at least one region of interest of the surface of a candidate document to be authenticated, the region of interest encompassing at least a portion of one of the security features;

digitally processing the sample image by performing a decomposition of the same image into at least one scale sub-space containing high resolution details of the sample image, and extracting classifying features from the scale sub-space, whose extracted classifying features are to be used for positioning the candidate document in a feature space that enables a classification of the candidate document; and deriving an authenticity rating of the candidate document based on the extracted classifying features, and positioning the candidate document in the feature space, the digital processing of the sample image comprising:

carrying out a wavelet transform of the sample image for deriving at least one set of wavelet coefficients which represent the high resolution details of the sample image at a small scale; and processing the wavelet coefficients to extract the classifying features.

A method for authenticating security documents, in particular banknotes, is known from US 2016/0012658 A1. This method is based on an analysis of intrinsic features of the security documents produced by intaglio printing, wherein the analysis involves a decomposition of one or more sample images of at least a portion of a candidate document to be authenticated based on wavelets, wherein each sample image is digitally processed by performing a wavelet transform of the sample image to derive a set of classification features allowing a classification of the candidate document within a multidimensional feature space (f), wherein the method is based on an adaptive wavelet approach, wherein the adaptive wavelet approach, amongst others, comprises the step of, prior to carrying out the wavelet transform, defining a categorization map (C-map) containing local information about different intaglio line structures that are found on the security documents.

A method for detecting security features is known from EP 2 639 774 A1, which are printed, applied or otherwise provided on security documents, the security features including characterizing visual features intrinsic to the processes used for producing the security documents, and the method comprising the following steps:

acquiring a sample image of at least one region of interest of the surface of a candidate document, the region of interest being selected so as to contain at least a portion of the security features;

digitally processing the sample image, the digital processing encompassing performing one or more iterations of a multi-scale analysis of the sample image to extract classifying features that are characteristic of the security features and that are used to position the candidate document in a feature space which enables a classification of the candidate document; and positioning the candidate document in the feature space based on the extracted classifying features, the classifying features being statistical parameters selected from the group consisting of the arithmetic mean (first moment in statistics), the variance (second moment in statistics), the skewness (third moment in statistics), the kurtosis (fourth moment in statistics), and the entropy of the statistical distribution of spectral coefficients representing high resolution details of the sample image at a small scale, the security features being intaglio patterns, and the security documents being banknotes.

It is known from US 2009/074301 A1 to recognize print properties that relate to a certain printing device.

Hereafter, a printed product shall be understood to mean a product produced by way of technology, this product on a surface of its substrate including at least one print image. The relevant print image, in turn, generally includes multiple image elements, which preferably differ from one another in terms of their frequency and alignment of contrast transitions as well as the different respective intensities of the light reflected by them. The image elements of the respective print image can have different geometries. The respective substrate of the printed product is formed, for example, by a paper material or by a plastic material or by a metallic material.

A value printed product is a specific type of a printed product, with a value printed product embodying economic value. Value printed products are, e.g., banknotes, postal stamps or revenue stamps, each of these described examples in each case denoting a certain sub-class of value printed products, i.e., of this specific type of printed products. Even though value printed products, as a result of printed security features that are integrated into these products, such as, amongst others, a tactile relief, a security thread or a hologram, and/or electronic security features, such as an integrated security chip, have a very high degree of protection against forgery, forgeries of value printed products nonetheless time and again enter circulation.

A value printed product is considered to be genuine when it was produced on a government-authorized production system. Production of a value printed product different therefrom is a criminal act, which is systematically investigated by and subject to punishment from governmental agencies. A production system here shall be understood to mean a printing device, including all its units and/or auxiliary devices, used to produce a value printed product. Forgeries of value printed products are frequently produced by means of a printing device that prints in a halftone printing process, such as, e.g., in a laser printing process or in an inkjet printing process or in an offset printing process, while value printed products produced on a government-authorized production system comprise on their substrate, almost without exception, at least one print image that is printed in a recess printing process, and in particular in an intaglio printing process. Other printing methods, such as the aforementioned halftone printing process, are optionally only used in addition to the recess printing process in genuine value printed products.

A print image printed in a recess printing process is characterized by high definition and a high level of detail, and has a contrast between its image elements that in terms of its intensity, at least thus far, has been unmatched by other printing methods, such as the aforementioned halftone printing processes. The intensity of the contrast also varies as a function of the level of the mechanical pressure used during the recess printing process, so that production systems, even though they may be able to print all value printed products in a recess printing process, due to their design-related, usually varying mechanical pressure levels can be distinguished from one another by the intensity of the contrast generated by them in the print image, and are thus identifiable.

Contrast, generally speaking, shall be understood to mean a difference in the brightness levels between two image elements. The contrast that exists between image elements of a print image can be machine-evaluated in that an optoelectronic detection device, configured, e.g., as a scanner or as a semiconductor camera, detects image elements of the relevant print image of the printed product to be examined, and creates a representation of this print image, composed of multiple discrete pixels, in the form of digital image data. These digital image data, for each of the pixels of the relevant representation, have at least one value for its respective brightness intensity and can, when needed, e.g., be supplemented by a value for a color shade and/or a value for a color saturation, wherein the aforementioned color properties, these being the color shade and the color saturation, in addition to the brightness, being the three properties of a discerned color that are perceived as being fundamental by people. In a representation that has at least the respective brightness intensity of the pixels, a contrast that exists between various pixels is an absolute difference between the brightness intensity of a brighter, and in particular the brightest, pixel and the brightness intensity of a darker, and in particular the darkest, pixel.

Printed products produced by way of technology, in particular in an industrial production operation, are generally produced in series production, wherein the copies of the relevant printed product produced in a certain series, after having been brought into circulation in an economic area, usually take very different paths. Furthermore, at least different face values are provided in particular in the case of value printed products. For example, a denomination established by government decree exists for banknotes of a currency in circulation. Like their counterfeits, genuine value printed products of a certain face value are generally produced in series production. During such a series production operation, multiple copies, which in particular are identical in terms of their face value, of the relevant value printed product are produced by simultaneous or directly consecutive production. During their circulation, these copies of the relevant value printed product, produced simultaneously or directly consecutively on a certain production system, take different paths in the economic area so that in particular counterfeit copies of the relevant value printed product of a certain series production run may be picked up in very different locations and also be submitted for a forensic examination by different governmental agencies, independently of one another.

However, the need to ascertain and prove, based on objective criteria, the respective identity of copies of a certain printed product exists not only for value printed products. The term 'identity' of copies of a printed product here means a collectivity of properties, based on which, generally, all copies of a certain printed product can be unambiguously identified to as great an extent as possible. The respective identity of copies of a certain printed product, however, is usually already successfully proven based on an identifier of the relevant printed product, wherein an identifier shall be understood to mean only a portion of the properties forming the identity, i.e., selected properties of a printed product. Furthermore, a digital identifier denotes properties of copies of the relevant printed product which can be ascertained by a processing unit and allow its automated identification. The identity of a printed product and/or its identifier can in each case be embodied, e.g., in the form of a pattern, wherein the respective pattern denotes a structure that is characterized by a recurrence or parallel uniform occurrence of features.

SUMMARY

It is an object of some examples herein to create a smartphone or tablet, each comprising a device for generating a digital identifier of a copy, including at least one print image, of a printed product produced in a production system, and to provide a method for using this device, so as to render the relevant copy of the printed product unambiguously identifiable based on its identifier.

The object is achieved according to some examples by a smartphone or tablet including a device configured to distinguish copies of the relevant printed product, which were produced on differing production equipment, based on their respective digital identifier, and to assign the currently represented copy of the relevant printed product based on its identifier to a certain production series of this printed product, wherein a production series comprises those copies of a particular printed product which were produced in or with the same production equipment. Further, a display device cooperating with the unit that evaluates the brightness values of the pixels is provided, this display device displaying the digital identifier, generated by the unit that evaluates the brightness intensities of the pixels, of the respective copy of the relevant printed product in the form of a graphical and/or alphanumerical display.

Additionally, in some examples, a method herein includes using the smartphone or tablet to use the device to generate a digital identifier of a copy, including at least one print image, of a printed product that is embodied as a value printed product in the form of a banknote or a postal stamp or a revenue mark or an identification document, and/or to use the device to generate a digital identifier of such a copy, including at least one print image, of a printed product that is embodied as a value printed product, in which the relevant copy of the printed product comprises a substrate that is formed of a paper material or of a plastic material or of a metallic material.

The advantages achieved with the invention are in particular that a copy of a printed product including at least one print image is unambiguously identifiable based on its identifier generated from brightness intensities of pixels. The respective copy of the relevant printed product can be objectively identified based on its identifier solely on the basis of technical criteria or features, and in particular based on intrinsic features, i.e., features that are inherent in a type-specific manner in the particular printed product, and can subsequently also be assigned, e.g., to a certain production series. A production series encompasses those copies of a certain print product which were produced in or with the same production system. The objective and unambiguous assignment of copies of a printed product to a certain production series based on the respective identifier furthermore allows the copies of the relevant printed product to be automatically categorized in groups. The automatic categorization of the copies of the relevant printed product prevents misclassification and/or incorrect categorization of these copies of the relevant printed product, e.g., into genuine and counterfeit copies. The described errors are those that, based on experience, inevitably occur during a manual check and assessment as a result of human, and thus subjective, factors, and at times create considerable consequential expenses. It is also possible to carry out the categorization of the copies of the relevant printed product in a completely automated manner by means of the identified solution.

BRIEF DESCRIPTION OF THE DRAWINGS

An exemplary embodiment of the invention is illustrated in the drawings and will be described in greater detail below. The drawings show.

DETAILED DESCRIPTION

A device for generating a digital identifier of a copy of a print product including at least one printed image comprises at least one optoelectronic detection device, wherein the optoelectronic detection device detects the at least one print image of the relevant copy of the printed product and, from the detected print image, creates a representation that is composed of a multiplicity of discrete pixels and ascertains at least the brightness intensity for each of these pixels. Moreover, this device for generating a digital identifier of the copy of the relevant printed product including at least one print image comprises a unit that cooperates with the optoelectronic detection device and evaluates the brightness intensities of the pixels, wherein this unit is configured so as to comprehensively segment the representation of the print image of the currently represented copy of the relevant printed product into multiple fields that each are composed of pixels of this representation, and so as to provide each of these fields with a piece of position information that is based on the represented print image of the relevant printed product. This unit is furthermore configured so as to ascertain, in each of these fields of adjoining pixels which are each composed of pixels of the current representation, a difference in their respective brightness intensities ascertained by the optoelectronic detection device, and so as to display the differences, ascertained from the brightness intensities of adjoining pixels, in the form of a frequency distribution, and so as to calculate, in the respective frequency distribution, a mean value and a standard deviation that is based on the respective mean value, as well as a skewness and a kurtosis of the respective frequency distribution. This unit is moreover also configured so as to store for all fields of the segmented current representation of the print image of the relevant printed product, in a memory cooperating with this unit, the respective piece of position information of each field, together with the standard deviation calculated in each case for the respective field, as well as skewness and kurtosis, as the digital identifier of the relevant copy of the printed product.

The printed product is embodied, e.g., as a value printed product, in particular as a banknote or as a postal stamp or as a revenue stamp or as an identification document. The respective copy of the relevant printed product comprises a substrate, which, e.g., is made of a paper material or of a plastic material or of a metallic material or of a combination of these materials. The respective copy of the relevant printed product has, on its substrate, in particular a surface printed in a recess printing process and/or can also include image elements printed, e.g., in a halftone printing process, such as a laser printing process or in an inkjet printing process or in an offset printing process. The respective copy of the relevant printed product includes, e.g., at least one printed security feature, such as a tactile relief, i.e., a relief perceptible by touch, or a security thread or a hologram. As an alternative or in addition, the respective copy of the relevant printed product can include an electronic security feature, such as an integrated security chip.

The optoelectronic detection device is configured, e.g., as a scanner or as a camera, in particular as a semiconductor camera, e.g., as a line camera or as an area scan camera. The unit cooperating with the optoelectronic detection device and evaluating the brightness intensities of the pixels is preferably configured as a digital processing unit, and in particular, as a processing unit comprising a microprocessor. The unit cooperating with the optoelectronic detection device is configured so as to identify the currently represented copy of the relevant printed product based on its identifier and preferably also assign it to a certain production series of this printed product. The unit cooperating with the optoelectronic detection device can furthermore also be configured so as to assign the currently represented copy of the relevant printed product based on its identifier to one of several different groups, wherein these groups are formed within a set of copies of this printed product and were established before production of this printed product started. In general, this results in a group of copies of the relevant printed product which are considered to be genuine and a respective group of printed products having the same appearance, which differs sufficiently from the remaining groups with respect to its production type. Copies of the relevant printed product that cannot be assigned without a doubt to an existing group, i.e., one of the aforementioned groups, can be allocated to a group that differs from the aforementioned groups and is provided for these cases of doubt, wherein a further examination is necessary for the copies of the relevant printed product which are assigned to this latter group. The unit cooperating with the optoelectronic detection device is advantageously configured so as to carry out the generation of the digital identifier, and possibly also in each case the assignment of the currently represented copy of the relevant printed product, in a completely automated manner.

Figure 1:
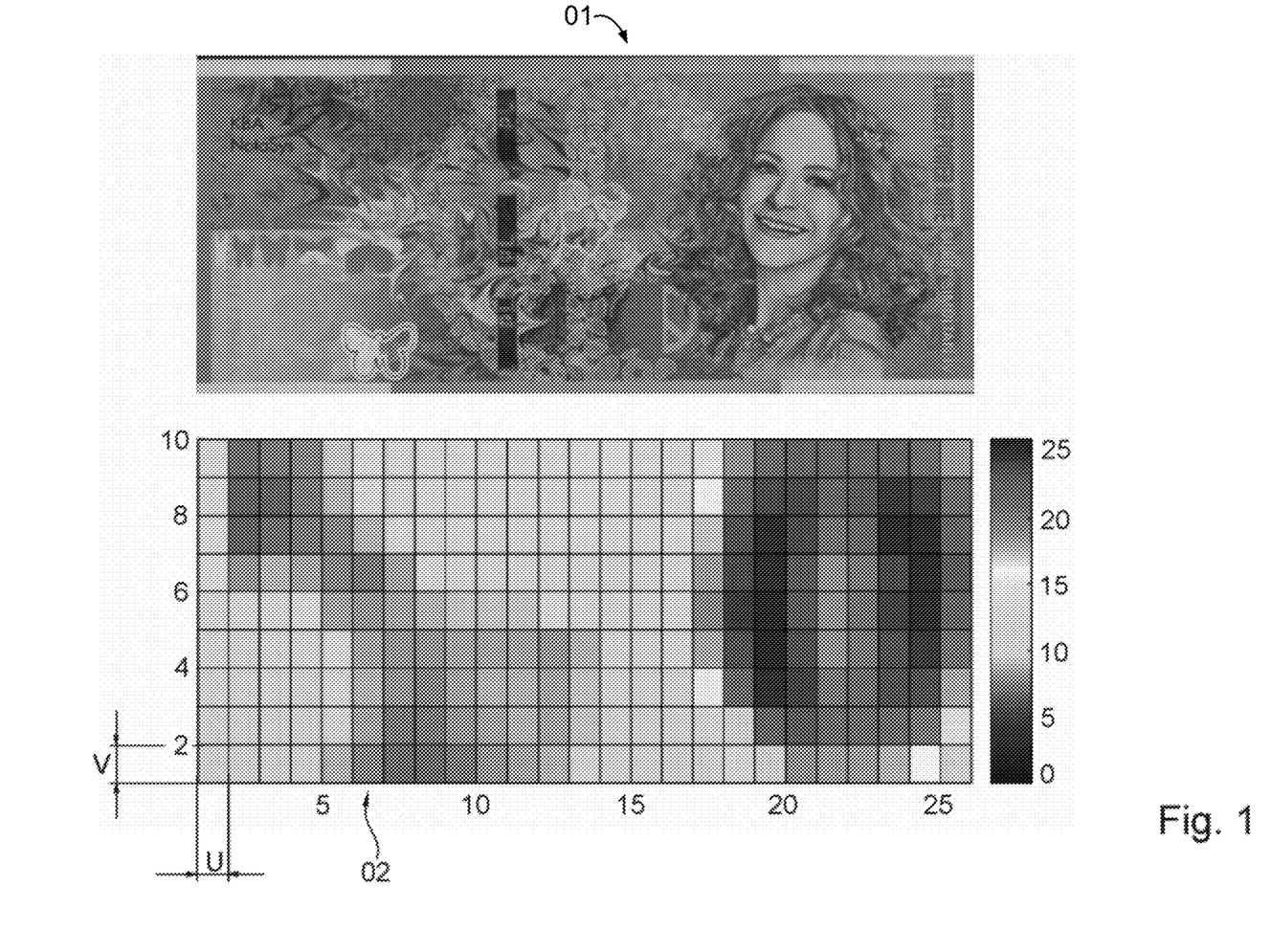
FIG. 1 a representation of a printed product and its segmentation.

The unit cooperating with the optoelectronic detection device is, e.g., configured in such a way that this unit comprehensively segments the representation of the print image of the currently represented copy of the relevant printed product into multiple rectangular fields 02 that have the same size and are each composed of pixels of this representation, as is shown in FIG. 1 based on the example of a banknote 01. In a particularly advantageous embodiment, it is provided that the unit cooperating with the optoelectronic detection device in each case arranges, in an overlapping manner, fields 02 that adjoin one another and segment the representation of the print image of the currently represented copy of the relevant printed product. The unit cooperating with the optoelectronic detection device and evaluating the brightness intensities of the pixels is, e.g., configured so as to preferably display the frequency distribution, which is ascertained from the brightness intensities ascertained by the optoelectronic detection device, for each of the fields 02 segmenting the current representation of the print image as a two-dimensional brightness profile. Optionally, a display device cooperating with the unit that evaluates the brightness values of the pixels is provided, e.g., a monitor, preferably having graphics capabilities, or a corresponding display, wherein this display device displays the digital identifier, generated by the unit that evaluates the brightness intensities of the pixels, e.g., by the digital processing unit, of the respective copy of the relevant printed product, and more particularly preferably in the form of a graphical and/or alphanumerical notice.

The device for generating a digital identifier of a copy of a printed product including at least one print image is, e.g., arranged in an electronic device, preferably in a mobile terminal, in particular in a smartphone or a tablet. In an advantageous embodiment of the invention, a smartphone or a tablet comprising a camera and a display as well as a microprocessor is configured so as to generate a digital identifier of a copy of a printed product which includes at least one print image, and so as to be usable accordingly.

Hereafter, the above-described steps to be carried out by the unit cooperating with the optoelectronic detection device and evaluating the brightness intensities of the pixels for generating the digital identifier will be explained based on an example. By way of example, a banknote 01 is selected as the printed product to be checked, without being limited thereto.

In the first step, a segmentation of the representation of the banknote 01 recorded by the optoelectronic detection device is carried out (FIG. 1). For this purpose, the representation is divided into rectangular, e.g., quadratic, preferably overlapping segments 02, also referred to as fields 02, wherein each of these fields 02 has orthogonal edges U; V having an edge dimension each of several, e.g., 400, pixels. Preferably, the individual segments 02 are then divided along their respective two orthogonal edges U; V into multiple, e.g., into three, equally wide, strip-shaped regions having, e.g., 400/3≈133 pixels. Adjoining fields 02 are thus in each case, e.g., arranged offset by one third with respect to one another, and in this example in each case overlap by two thirds. Thereafter, each individual field 02 is, e.g., transformed using a stationary wavelet transform (SWT). The resulting detail coefficients for horizontal, vertical and diagonal structures are aggregated to cG detail coefficients. In this way, all detected structure transitions of a section or field 02 of the relevant banknote 01 are combined in a cG detail coefficient matrix. Thereafter, a standardized discrete probability density of the wavelet coefficients is generated in the form of a histogram H according to the following formula:

$$H_n(p) = [1/(N*M)]*H(p)$$

where p is the amplitude of the wavelet detail coefficients, and N is the number of rows and M is the number of columns of the cG detail coefficient matrix.

Figure 2:
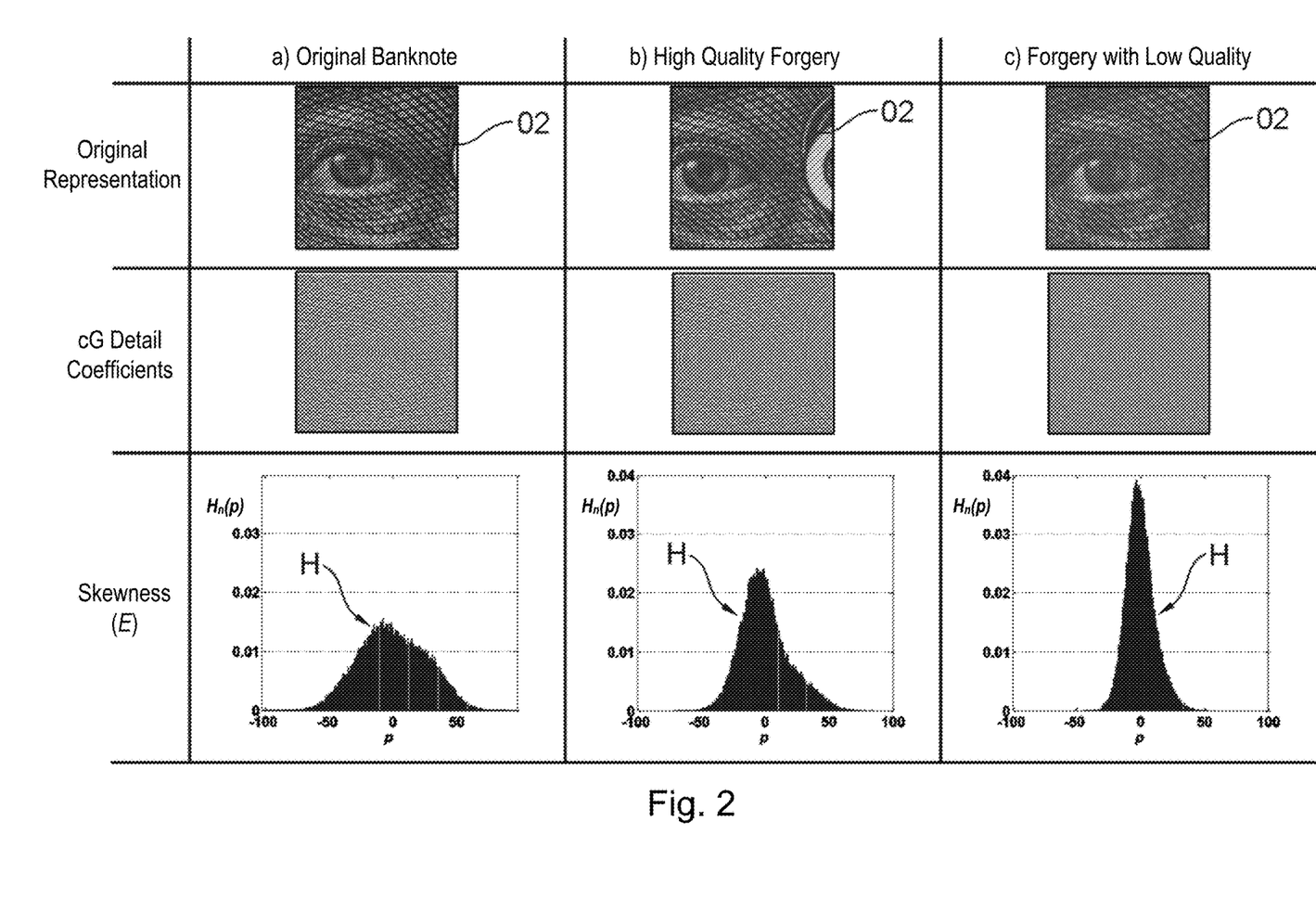
FIG. 2 a tabular illustration of steps that relate to an extraction of features from a field of the representation of the printed product.

FIG. 2 shows, in the form of entries in a table, several steps that relate to an extraction of features from a field 02, selected by way of example, of the representation of the banknote 01 created by the optoelectronic device, as well as results resulting therefrom in a direct comparison. In the first row of FIG. 2, fields 02 that are extracted, e.g., from three different banknotes 01 and comparable to one another are shown, and more particularly in the first column (a) the relevant field 02 of an original banknote is shown, in the center column (b) the relevant field 02 of a high-quality forgery is shown, and in the third column (c) the relevant field 02 of a low-quality forgery is shown. The second row of FIG. 2 shows the aggregated cG detail coefficients. For all transformations, a difference between the original banknote and the forgeries is apparent from the illustration of the cG detail coefficients. While the edges in the representation of the selected field 02 of the original banknote clearly stand out, the corresponding representations in the fields 02 of the forgeries are blurred, and in part hardly recognizable.

The third row of FIG. 2 illustrates the respective frequency distribution of the cG detail coefficients for the original banknote and for the forgeries in individual histograms H. It is apparent that the frequency distribution, e.g., of gray values in the representation of the selected field 02 of the original banknote differs considerably in its shape from the respective shape of the forgeries. Due to the more clearly pronounced edges, the histogram H of a structure that is contained in the original banknote and generated by an intaglio process has more high-frequency components. The histogram H related to the original banknote overall is more platykurtic. Significantly fewer high-frequency components occur in forgeries, so that lower frequency amounts dominate, and the histogram H is more leptokurtic compared to that of an original banknote. By calculating statistical features common in image processing, preferably the variance, the skewness and the kurtosis, global information about the image structure can be provided.

The variance describes the spread of the amplitudes p of the wavelet detail coefficients by the arithmetic mean $\bar{I} = \Sigma p * H_n(p)$, wherein the arithmetic mean $\bar{I}$ forms a first moment in statistics. The variance then forms the second moment in statistics. In terms of the formula, the variance can be represented as follows:

$$\sigma^2 = \Sigma(p-\bar{I})^2 * H_n(p)$$

The skewness of a histogram H, which is also referred to as the third moment in statistics, indicates the degree of asymmetry of a distribution. The skewness describes the degree of the deviation of a histogram distribution from the Gaussian normal shape.

If the distribution deviates to the left, the skewness is positive, and if it deviates to the right, the skewness is negative. One can also say that the skewness is the symmetry of the frequency distribution about the mean $\bar{I}$ and thus reflects a horizontal deviation. In terms of the formula, the skewness can be represented as follows:

$$E = (1/\sigma^3) * \Sigma(p-\bar{I})^3 * H_n(p)$$

The kurtosis (excess) forms the fourth moment in statistics. The kurtosis is a measure of the steepness of the distribution. This measure describes whether the amplitudes p of the wavelet coefficients are distributed in a steep or flat manner around the center. If the kurtosis is positive, the distribution is steeper than the normal distribution. This is therefore referred to as a leptokurtic distribution. If the kurtosis is negative, the distribution is flatter than the normal distribution, and is therefore referred to as a platykurtic distribution. The kurtosis reflects the deviation of the current frequency distribution from the normal distribution, and thus reflects a vertical deviation. In terms of the formula, the kurtosis can be represented as follows:

$$C = (1/\sigma^4) * (\Sigma(p-\bar{I})^4 * H_n(p)) - 3$$

In summary, the features calculated in the aforementioned steps reflect the sharpness of the respective representation to be examined. In particular the second moment in statistics, i.e., the variance, is considered to be an indicator for the degree of sharpness of a representation, with the structure edges in the respective representation becoming sharper, the higher the value of the variance is.

In a preferred embodiment of the invention, the device of the type in question is configured in such a way that, in a next step, a categorization of the examined banknote 01 based on the digital identifier is carried out. For this purpose, the three feature values variance, skewness and kurtosis are used to generate the unambiguous identifier for the respective segment 02 or field 02. The combination of the respective feature values of all segments 02 of a banknote 01 with a piece of information about the location of the respective segment 02 within the relevant banknote 01, i.e., with a piece of position information, forms a three-dimensional characterization of this banknote 01 in the form of a three-dimensional matrix, wherein this three-dimensional characterization or matrix is also referred to as a digital fingerprint of the relevant printed product 01, here a banknote 01. This three-dimensional characterization or matrix of the relevant printed product 01 forms its digital identifier to be generated.

Figure 3:
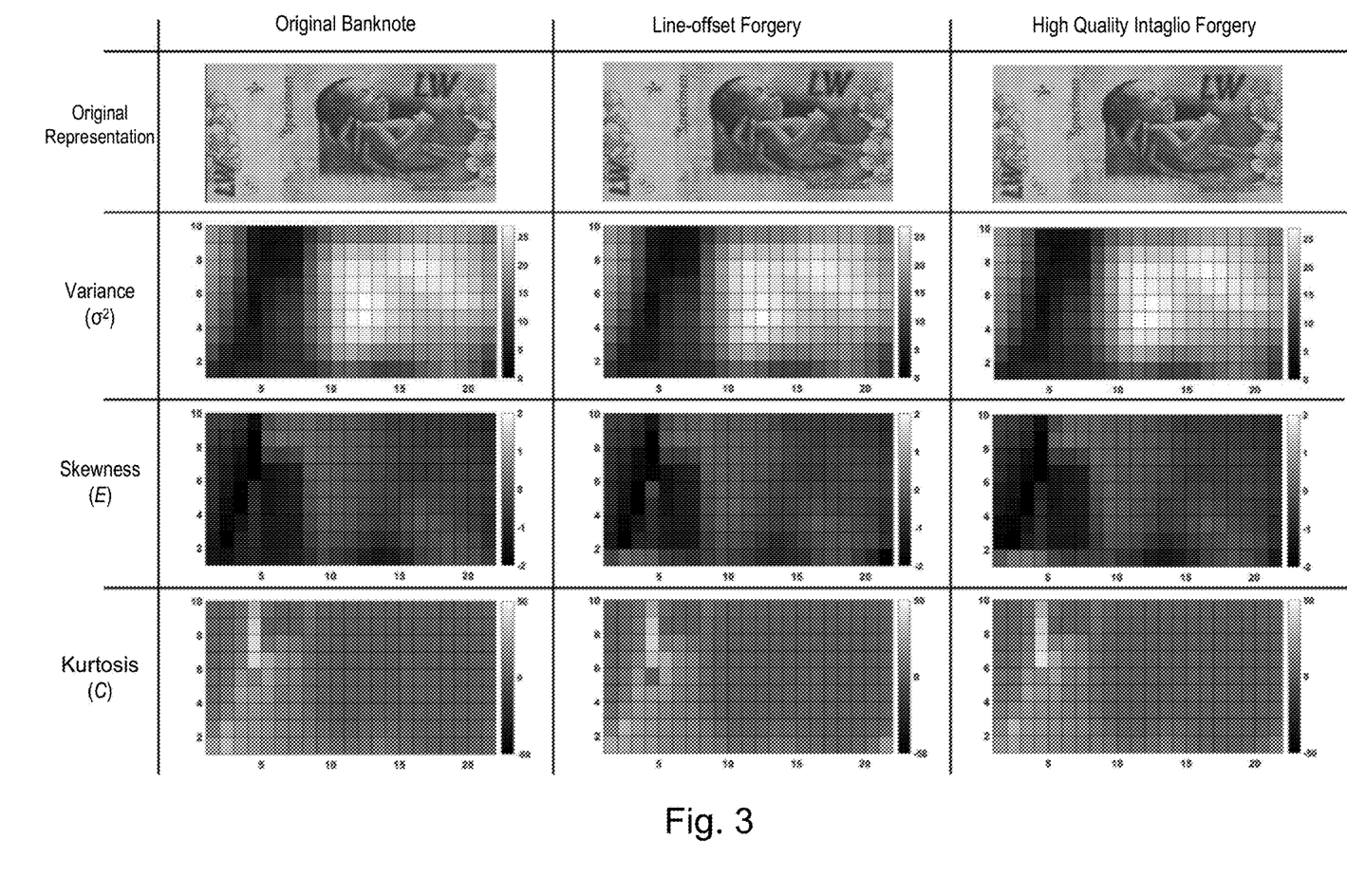
FIG. 3 an illustration of a graphical representation of a generated identifier.

In a table, FIG. 3 shows, by way of example, a graphical representation of the respective generated identifier, each composed of the features variance, skewness and kurtosis, for an original banknote and for two forgeries, e.g., a line-offset forgery and a high-quality intaglio forgery, in a comparison.

For better illustration, FIG. 3 shows the respective three-dimensional characterization of the banknotes 01 selected as the example as three separate gray value matrices, which are in each case inked between the values 0 and 255 corresponding to the minima or the maxima. It is apparent from FIG. 3 that the structure of the individual gray value matrices is in each case quite similar with respect to the particular feature. If, in contrast, the individual gray value matrices are compared in pairs between the original banknote and its forgeries, it is noticeable that the values of the features differ considerably from one another, even though the discontinuities in the representation, caused by the main motif, can be easily observed in the gray value matrices of the variance for all banknotes 01.

Based on the digital identifier, i.e., the fingerprint, it is possible to compare banknotes 01 to one another. Various options exist for determining the similarity between fingerprints of two banknotes 01. One of these options is, e.g., a calculation of correlation coefficients that is carried out in the processing unit. Initially, a correlation coefficient between the individual fingerprint matrices is determined, so that a similarity degree can be ascertained for each feature matrix. In the case of the feature matrices shown by way of example in FIG. 3, three correlation values $corr\sigma_2$, $corrE$, $corrC$ would result. Finally, a similarity degree between two banknotes 01 is determined by a suitable aggregation of these three correlation values $corr\sigma_2$, $corrE$, $corrC$. In this way, e.g., the similarity degree results from the uniform weighting of the individual correlation coefficients as $$corr_{all} = (corr\sigma_2 + corrE + corrC)/3$$

Moreover, it is possible, based on the generated digital identifier for copies of the relevant printed product 01 configured, e.g., as a banknote 01, to categorize the forgeries, e.g., into counterfeit money classes. For this purpose, the banknote 01 to be examined is not compared to another banknote 01, but to a model of a digital identifier of a forgery class. Furthermore, it is possible to model a digital identifier, i.e., a fingerprint of a forgery class, using arbitrary constructs. One of these options is a region-based determination of the mean value of all fingerprints of the banknotes 01 that belong to the respective counterfeit money class.

The above exemplary embodiment has demonstrated how a digital identifier, i.e., a so-called digital fingerprint, of a copy of a printed product can be generated. By calculating correlation coefficients between the respective digital identifiers of different copies of the relevant printed product, a similarity degree between the relevant copies can be determined.

Figure 4:
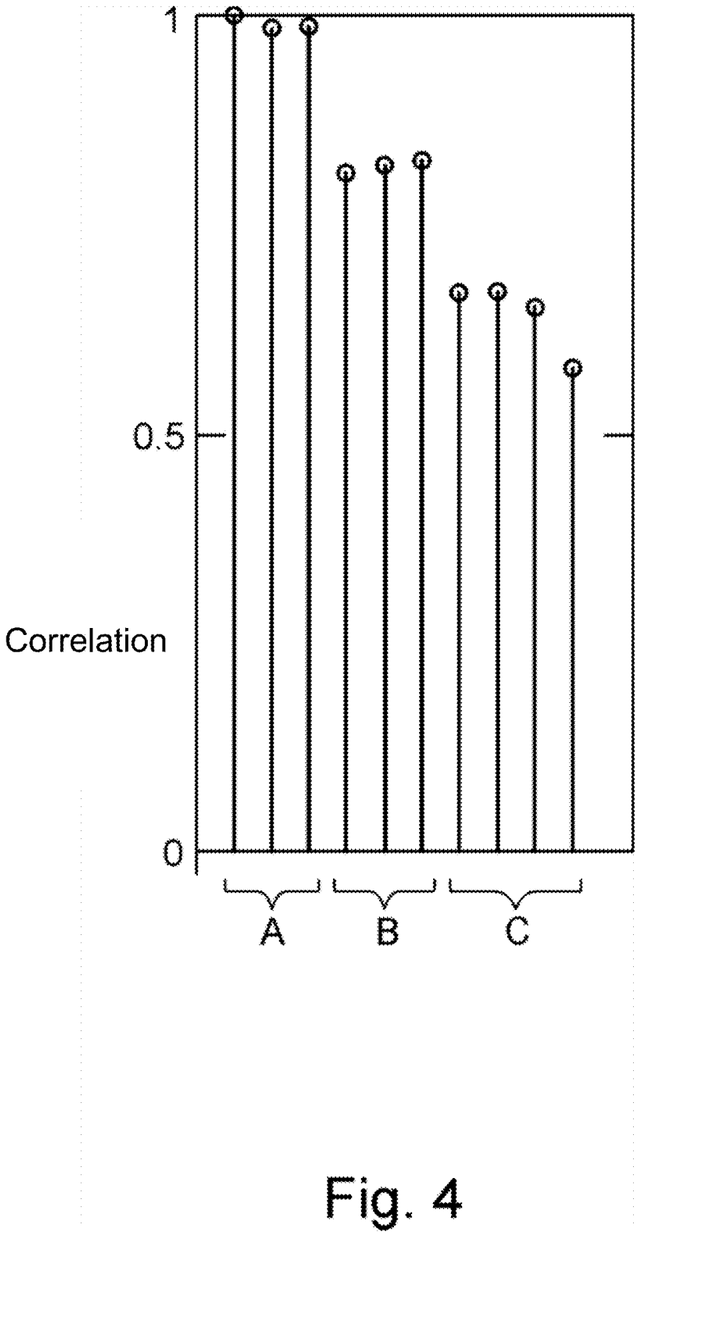
FIG. 4 an illustration of groups to which various checked copies of a printed product are assigned.

Based on this, the copies of the relevant printed product can be categorized or divided into groups, wherein, in the case of banknotes 01, this categorization is in particular carried out as a function of their face value and the printing method used. Copies of the relevant printed product that were produced according to the same printing method have a similar digital identifier, while copies of the relevant printed product that were produced on differing production systems can be clearly distinguished based on their respective digital identifier. FIG. 4 shows an example of copies of the relevant printed product assigned to the three groups A; B; C based on correlation coefficients.

With the aid of the described device for generating a digital identifier of a copy of a printed product which includes at least one print image, it is also possible to classify forgeries. The described solution can furthermore be used for assistance when establishing and/or uncovering links between individual (digital) forgeries that were seized in different locations.

If necessary, further physical features can be incorporated into the evaluation, in addition to an evaluation of the brightness intensities of pixels. In this way, it is possible, e.g., to use recognized screen frequencies, information about the respective color spectra of the individual printing inks, information about the color screen arrangement and/or the resulting color spectra within a segment 02 or a field 02 as at least one further criterion for enhanced characterization of the copies of a printed product, in particular of banknotes 01.

Using the described device, it is thus possible to carry out a method having all of the aforementioned steps, so as to render a copy of a relevant printed product unambiguously identifiable based on its identifier.

This in particular yields a method for using the above-described device, wherein this device is used to generate a digital identifier of a copy, including at least one print image, of a printed product that is embodied as a value printed product in the form of a banknote or a postal stamp or a revenue mark or an identification document.

This also yields a method for using the described device, wherein this device is used to generate a digital identifier of such a copy, including at least one print image, of a printed product that is embodied as a value printed product, in which the relevant copy of the printed product comprises a substrate that is formed of a paper material or of a plastic material or of a metallic material. This device is preferably used to generate a digital identifier of such a copy, including at least one print image, of a printed product that is embodied as a value printed product, in which the relevant copy of the printed product has, on its substrate, a surface printed in a recess printing process. As an alternative or in addition, this device is used to generate a digital identifier of such a copy, including at least one print image, of a printed product that is embodied as a value printed product, in which the relevant copy of the printed product has at least one printed security feature in the form of a tactile relief and/or a security thread and/or a hologram. This device can furthermore be used to generate a digital identifier of such a copy, including at least one print image, of a printed product that is embodied as a value printed product, in which the relevant copy of the printed product comprises an electronic security feature in the form of an integrated security chip.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A method of using a smartphone or a tablet for generating a digital identifier of a received copy of a printed product, wherein the received copy of the printed product includes at least one print image, the method comprising:
  using an optoelectronic detection device of the smartphone or tablet to detect digital image information of the at least one print image of the received copy of the printed product,
  creating, from the detected digital image information, a representation of the at least one print image, the representation composed of a multiplicity of pixels, wherein the representation is used by a unit of the smartphone or tablet to evaluate a brightness intensity for each pixel of the multiplicity of pixels, wherein evaluating the brightness intensity of each pixel of the multiplicity of pixels comprises:
    segmenting the representation of the at least one print image into multiple fields that are each composed of a portion of the pixels of the multiplicity of pixels of the representation;
    associating position information with each respective field of the multiple fields of the representation, the position information indicating a location of the respective field of the multiple fields within the representation of the at least one print image;
    determining, for each respective field of the multiple fields of the representation, differences in respective brightness intensities of pixels in the respective field, the respective brightness intensities having been detected by the optoelectronic detection device;
    causing to be displayed, on a display associated with the smartphone or tablet, a respective frequency distribution based on the differences in the respective brightness intensities of the pixels in each respective field of the multiple fields;
    calculating, based on the respective frequency distribution, a respective mean value, and a respective standard deviation that is based on the respective mean value, and further calculating a respective skewness and a respective kurtosis of the respective frequency distribution; and
    storing, in the smartphone or tablet, for each respective field of the multiple fields of the representation, respective position information of each respective field, together with the respective standard deviation calculated for each respective field, as well as the respective skewness and the respective kurtosis for each respective field, as the digital identifier of the received copy of the printed product;
  for a plurality of copies of the printed product that were produced using same or differing production equipment, distinguishing the plurality of copies based on respective digital identifiers of respective copies of the plurality of copies;
  assigning the received copy of the printed product corresponding to the representation, and based on the digital identifier of the received copy of the printed product, to a certain production series of the printed product, wherein a production series comprises those copies of a particular printed product which were produced in or with the same production equipment; and
  causing the display to display the digital identifier of the received copy of the printed product in a form of a graphical and/or alphanumerical display.

2. The method according to claim 1, further comprising subsequently identifying the received copy of the printed product based at least on the digital identifier of the received copy of the printed product stored in the smartphone or tablet.

3. The method according to claim 1, further comprising categorizing the received copy of the printed product based on the digital identifier of the received copy of the printed product by assigning the received copy of the printed product to one of a plurality of different groups, the plurality of different groups being formed based on a set of copies of the printed product and having been established before production of the printed product started, wherein the categorizing is carried out, at least in part, as a function of a face value of the copies of the printed product and of a printing method used for production of the printed product.

4. The method according to claim 1, further comprising generating the digital identifier of the received copy of the printed product and/or determining an assignment of the received copy of the printed product to the certain production series in a completely automated manner exclusive of manual human assessment.

5. The method according to claim 1, wherein the segmenting the representation of the at least one print image into the multiple fields further comprises segmenting the representation into multiple rectangular fields that have a same size and that are each composed of a respective portion of the pixels of the representation.

6. The method according to claim 1, further comprising arranging, in an overlapping manner, fields of the multiple fields that adjoin one another when segmenting the representation of the at least one print image so that adjoining fields are arranged partially offset with respect to each other.

7. The method according to claim 1, further comprising causing the display to display the respective frequency distribution for each respective field of the multiple fields as a two-dimensional brightness profile.

8. The method according to claim 1, wherein the optoelectronic detection device is configured as a scanner or as a semiconductor camera.

9. The method according to claim 1, wherein the unit is configured as a digital processing unit.

10. The method according to claim 1, wherein the printed product is embodied as a value printed product in a form of a banknote or a postal stamp or a revenue mark or an identification document.

11. The method according to claim 1, wherein the printed product is embodied as a value printed product, in which the received copy of the printed product comprises a substrate that is formed of a paper material or of a plastic material or of a metallic material.

12. The method according to claim 11, wherein the received copy of the printed product has, on the substrate, a surface printed in a recess printing process.

13. The method according to claim 1, wherein the received copy of the printed product has at least one printed security feature including a tactile relief and/or a security thread and/or a hologram.

14. The method according to claim 1, wherein the received copy of the printed product comprises an electronic security feature including an integrated security chip.

* * * * *